(12) United States Patent
Mori et al.

(10) Patent No.: US 8,560,166 B2
(45) Date of Patent: Oct. 15, 2013

(54) CONTROL SYSTEM FOR VEHICLE AND METHOD FOR CONTROLLING IN-VEHICLE APPARATUS

(75) Inventors: Takuya Mori, Kariya (JP); Tetsuya Hara, Okazaki (JP); Norio Yamamoto, Kariya (JP); Kousuke Hara, Hachioji (JP); Hirotoshi Iwasaki, Kawasaki (JP)

(73) Assignee: DENSO CORPORATION, Kariya (JP)

( * ) Notice: Subject to any disclaimer, the term of this patent is extended or adjusted under 35 U.S.C. 154(b) by 602 days.

(21) Appl. No.: 12/762,802

(22) Filed: Apr. 19, 2010

(65) Prior Publication Data

US 2010/0268412 A1 Oct. 21, 2010

(30) Foreign Application Priority Data

Apr. 20, 2009 (JP) ................... 2009-102317

(51) Int. Cl.
*G01M 17/00* (2006.01)
(52) U.S. Cl.
USPC ........................................ 701/32.7
(58) Field of Classification Search
None
See application file for complete search history.

(56) References Cited

U.S. PATENT DOCUMENTS

| | | | |
|---|---|---|---|
| 6,314,352 B1 | 11/2001 | Kunimatsu et al. | |
| 2001/0020893 A1* | 9/2001 | Kawai et al. | 340/425.5 |
| 2007/0053513 A1* | 3/2007 | Hoffberg | 380/201 |
| 2008/0001708 A1* | 1/2008 | Nakashima et al. | 340/5.72 |
| 2008/0126145 A1* | 5/2008 | Rackley, III et al. | 705/7 |

FOREIGN PATENT DOCUMENTS

| | | |
|---|---|---|
| JP | A-2005-329800 | 12/2005 |
| JP | A-2006-001305 | 1/2006 |
| JP | A-2008-105608 | 5/2008 |
| JP | A-2008-290714 | 12/2008 |

OTHER PUBLICATIONS

Office Action mailed Dec. 11, 2012 in corresponding JP Application No. 2009-102317 (and English translation).

* cited by examiner

*Primary Examiner* — Thomas Tarcza
*Assistant Examiner* — Adam Alharbi
(74) *Attorney, Agent, or Firm* — Posz Law Group, PLC

(57) ABSTRACT

An obtaining unit obtains information about a condition where a vehicle is placed. A detection unit detects at least one of a voice and an action of an occupant of the vehicle. An estimation unit estimates an in-vehicle apparatus to be a controlled target according to the condition where the vehicle is placed. A determination unit determines an in-vehicle apparatus to be a controlled in-vehicle apparatus and determines a control content thereof in consideration of the at least one of a voice and an action. A notification unit notifies the occupant of the in-vehicle apparatus to be controlled and the control content thereof determined by the determination unit. A control unit controls the in-vehicle apparatus according to the determination of the determination unit when receiving a response to the notification of the notification unit from the occupant to permit the control of the in-vehicle apparatus.

30 Claims, 6 Drawing Sheets

FIG. 5

| SCENE | DRIVER INFO (KEY ID) | CONTROLLED DEVICE | |
|---|---|---|---|
| A (GS: FULL) | 1 | FUEL LID | OPEN |
| | | P/W | OPEN |
| | | TRIP METER | RESET |
| B (GS: SELF) | 2 | FUEL LID | OPEN |
| | | DOOR | UNLOCK |
| | | TRIP METER | RESET |
| C (FOG) HUM a% TEMP b°C | 1 | DEFROSTER | ON |
| ⋮ | | | |

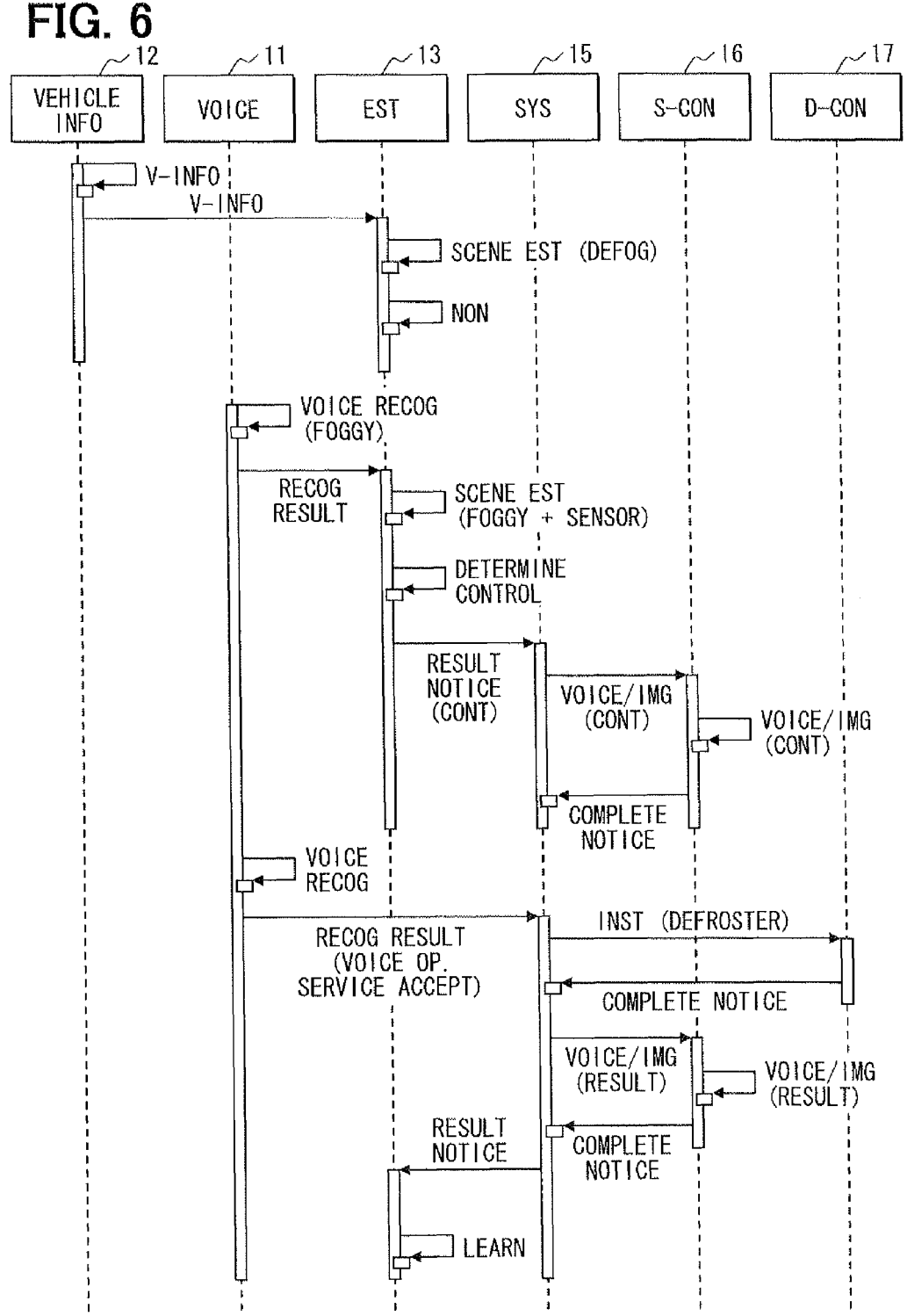

CONTROL SYSTEM FOR VEHICLE AND METHOD FOR CONTROLLING IN-VEHICLE APPARATUS

CROSS REFERENCE TO RELATED APPLICATIONS

This application is based on and incorporates herein by reference Japanese Patent Application No. 2009-102317 filed on Apr. 20, 2009.

FIELD OF THE INVENTION

The present invention relates to a control system for a vehicle, the control system configured to control multiple in-vehicle apparatuses according to a condition where the vehicle is placed. The present invention relates to a method for controlling an in-vehicle apparatus.

BACKGROUND OF THE INVENTION

Conventionally, a control system for an in-vehicle apparatus disclosed in U.S. Pat. No. 6,314,352 B1, which corresponds to JP-A-2000-127869, is known. When obtaining tunnel information from a navigation system, for example, the system activates a light device, closes a window and a sunroof, switches an airconditioner to circulate interior air, and manipulates an audio device to provide traffic information using a radio device. Further, the system intermittently activates a wiper or stops the wiper when the wiper is activated. The system returns the operation of each of the in-vehicle devices to an initial state. Alternatively, when obtaining tollgate information from a navigation device, the system controls to open a window on the drivers seat, close other windows and a sunroof, and decrease a sound volume of the audio device. Alternatively, when determining that the vehicle stops in a fuel station according to fuel station information obtained from the navigation device, the system controls to open a window of the driver's seat, open a fuel lid, and reset a trip meter. The system disclosed in U.S. Pat. No. 6,314,352 B1 notifies a driver of the above-described control contents. The system performs a control of the control contents when receiving a response from the drive to permit the control. Thus, the system is capable of performing the control reflecting an intention of the driver.

The above-described control system includes a detection unit such as a navigation system for detecting trigger information for performing a control. Thus, a control unit of the system finally determines a control content based on the detected trigger information. For example, a fuel station includes a full-service station, in which a salesclerk supplies fuel, and a self-service station, in which an occupant of a vehicle supplies fuel. Such distinction between a full-service station and a self-service station is undetectable by a detection device of a vehicle. Therefore, the system may suggest an unnecessary control such as opening of a window of the driver's seat even when an occupant of a vehicle uses a self-service station. Consequently, an occupant of the vehicle may be bothered by unnecessary suggestion. Alternatively, when it is determined that a windshield of the vehicle is fogged based on a humidity in the vehicle interior and a temperature difference between a vehicle interior and a vehicle exterior, a defroster of an airconditioner of the vehicle may be activated. It is noted that, even when it is not determined that a windshield is fogged according to detection signals of various sensors, a windshield may be fogged due to various disturbance factors. In this case, a detection device of the vehicle cannot detect trigger information for activating the defroster. Therefore, the defroster is not activated, and the windshield is not defogged for an occupant of the vehicle.

SUMMARY OF THE INVENTION

In view of the foregoing and other problems, it is an object of the present invention to produce a control system for an in-vehicle apparatus capable of suggesting a service provided by a further suitable in-vehicle apparatus in a condition where a vehicle is placed. It is another object to produce a method for controlling an in-vehicle apparatus.

According to one aspect of the present invention, a control system for a vehicle, the control system comprises a plurality of in-vehicle apparatuses of the vehicle. The control system further comprises an obtaining unit configured to obtain information about a condition where the vehicle is placed. The control system further comprises a detection unit configured to detect at least one of a voice and an action of an occupant of the vehicle. The control system further comprises a determination unit configured to estimate an in-vehicle apparatus from the plurality of in-vehicle apparatuses to be a controlled target according to the condition where the vehicle is placed and determine an in-vehicle apparatus to be controlled from the plurality of in-vehicle apparatuses and a control content of the determined in-vehicle apparatus in consideration of the detected at least one of a voice and an action of the occupant. The control system further comprises a notification unit configured to notify the occupant of the in-vehicle apparatus to be controlled determined by the determination unit and the control content of the determined in-vehicle apparatus. The control system further comprises a control unit configured to control the determined in-vehicle apparatus according to the determination of the determination unit when receiving a response to the notification of the notification unit from the occupant to permit the control of the determined in-vehicle apparatus.

According to another aspect of the present invention, a method for controlling an in-vehicle apparatus of a vehicle, the method comprises obtaining information about a condition where the vehicle is placed. The method further comprises detecting at least one of a voice and an action of an occupant of the vehicle. The method further comprises estimating a controlled target from the plurality of in-vehicle apparatuses according to the condition where the vehicle is placed. The method further comprises determining an in-vehicle apparatus to be controlled from the plurality of in-vehicle apparatuses and determining a control content of the determined in-vehicle apparatus in consideration of the estimated controlled target and the detected at least one of a voice and an action of the occupant. The method further comprises notifying the occupant of the determined in-vehicle apparatus and the determined control content. The method further comprises performing the determined control content of the determined in-vehicle apparatus when receiving a response to the notification of the notification unit from the occupant to permit the control content.

According to another aspect of the present invention, a control system further comprises a control system for a plurality of in-vehicle apparatuses of a vehicle, the control system comprises an obtaining unit configured to obtain information about a condition where the vehicle is placed. The control system further comprises a detection unit configured to detect at least one of a voice and an action of an occupant of the vehicle. The control system further comprises a determination unit configured to estimate a controlled target from the plurality of in-vehicle apparatuses according to the condition where the vehicle is placed and determine an in-vehicle apparatus to be controlled from the plurality of in-vehicle apparatuses and a control content of the determined in-vehicle apparatus in consideration of the estimated controlled target and the detected at least one of a voice and an action of the occupant. The control system further comprises a notification unit configured to notify the occupant of the determined in-vehicle apparatus and the determined control content. The control system further comprises a control unit configured to perform the determined control content of the determined in-vehicle apparatus when receiving a response to the notification of the notification unit from the occupant to permit the control content.

BRIEF DESCRIPTION OF THE DRAWINGS

The above and other objects, features and advantages of the present invention will become more apparent from the following detailed description made with reference to the accompanying drawings. In the drawings:

FIG. 5 is a diagram showing one example of learning data; and

FIG. 6 is a sequence chart showing a defogging control, when a window of the vehicle is fogged, as a second control example performed by the control system.

DETAILED DESCRIPTION OF PREFERRED EMBODIMENTS

First Control Example

Figure 1:
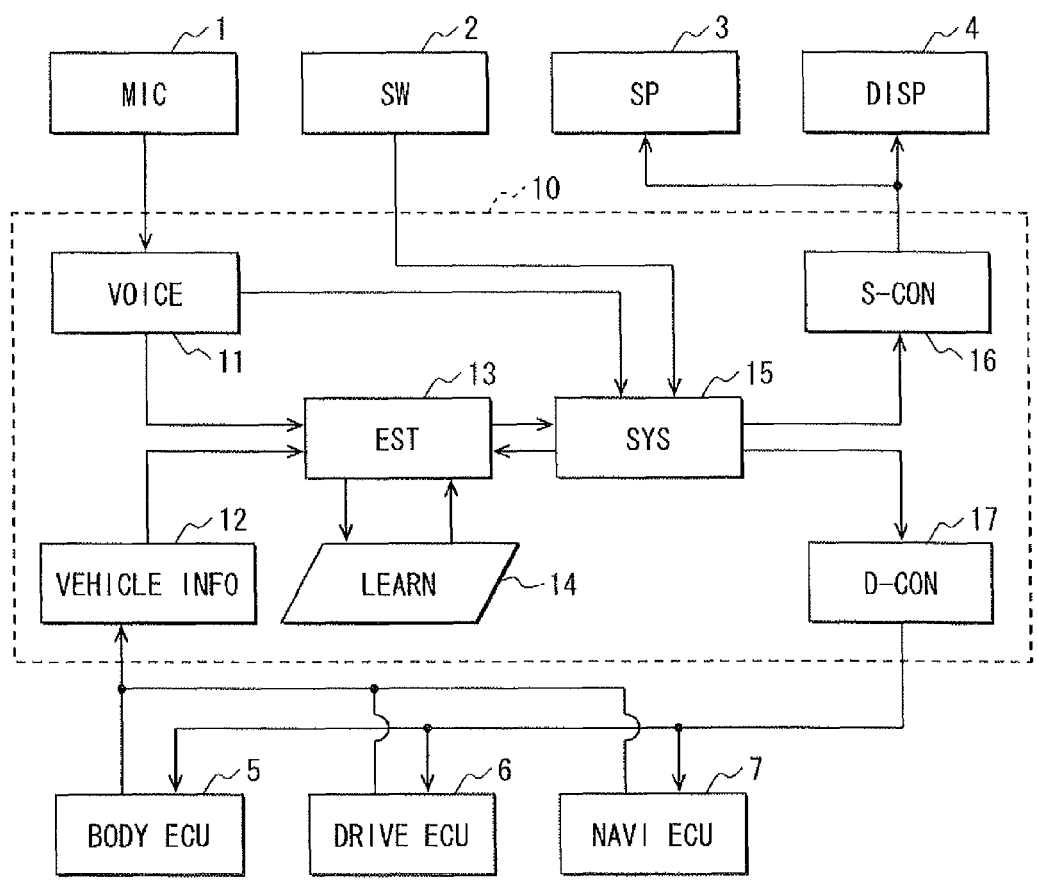
FIG. 1 is a block diagram showing an entire structure of a control system for an in-vehicle apparatus according to an embodiment.

As follows, a control system for an in-vehicle apparatus will be described with reference to drawings. FIG. 1 is a block diagram showing an entire structure of the control system for an in-vehicle apparatus according to the present embodiment. In FIG. 1, a microphone 1 inputs voice of an occupant of a vehicle and outputs voice data of the voice as an electric signal. The voice data outputted from the microphone 1 is inputted to a voice recognition unit 11 of a control device 10. The voice recognition unit 11 has a dictionary for recognition (not shown) and recognizes each of words and phrases contained in the voice data with reference to the dictionary for recognition. A recognition result of the voice recognition unit 11 is inputted to an estimation unit 13.

In the present embodiment, the control device 10 is connected with a body ECU 5, a traveling ECU 6, and a navigation ECU 7 via an in-vehicle LAN and communicable with each other. That is, the control device 10 and each of the ECUs 5 to 7 are connected with each other via the in-vehicle LAN. Each of the ECUs 5 to 7 periodically transmits information about a condition, where the vehicle is placed, to the control device 10. The body ECU 5 is connected with various sensors, such as a fuel quantity sensor, a moisture sensor, a vehicle interior temperature sensor, a vehicle exterior temperature sensor, and a solar sensor. The fuel quantity sensor detects a quantity of fuel remaining in a fuel tank. The moisture sensor detects a humidity inside the vehicle. The vehicle interior temperature sensor detects a temperature inside the vehicle. The vehicle exterior temperature sensor detects a temperature outside the vehicle. The solar sensor detects intensity of solar radiation. The body ECU 5 periodically transmits a detection result of the various sensors to the control device 10, as information about the condition where the vehicle is placed. The traveling ECU 6 is connected with a vehicle speed sensor for detecting a traveling speed of the vehicle. The traveling ECU 6 periodically transmits a detection result of the vehicle speed sensor to the control device 10. The navigation ECU 7 periodically transmits a self-vehicle position, a road on which the vehicle travels, and a facility in the vicinity of the vehicle to the control device 10. The self-vehicle position is calculated using signals of a GPS receiver, the vehicle speed sensor, and a yaw rate sensor.

A vehicle information input unit 12 of the control device 10 inputs the information transmitted from each of the ECUs 5 to 7 and outputs information to the estimation unit 13. The estimation unit 13 estimates an in-vehicle apparatus, which is a controlled target, based on the information about the condition, where the vehicle is placed, inputted from the vehicle information input unit 12. The estimation unit 13 further determines an in-vehicle apparatus, which is to be controlled, and a content (control content) of control of the determined in-vehicle apparatus based on the recognition result of the voice data inputted from the voice recognition unit 11 and stored learning data 14. The learning data 14 is a control history of the controlled in-vehicle apparatus and a control content of the controlled in-vehicle apparatus when a control (control content) of the in-vehicle apparatus is performed. The learning data 14 is stored for each of scenes, which specifies the condition where the vehicle is placed.

In the present embodiment, an in-vehicle apparatus to be controlled and a control content thereof are determined based on the recognition result of the voice of an occupant in the vehicle. Therefore, information unacquirable by a sensor of the vehicle can be detected based on a voice of an occupant. In addition, a state, where a control is needed even when a condition for performing the control is not completely satisfied, can be also detected based on a voice of an occupant. Therefore, an in-vehicle apparatus to be controlled and a control content thereof can be further appropriately determined based on occupant's voice. In the present embodiment, an in-vehicle apparatus to be controlled and a control content thereof may be determined based on the learning data 14. An occupant of a vehicle has a tendency to prefer to receive a similar service to a service produced by an in-vehicle apparatus in the past when a condition where the vehicle is placed is similar. Therefore, an in-vehicle apparatus to be controlled and a control content thereof can be also further appropriately determined based on the learning data 14.

A determination result of the estimation unit 13 is provided to a system control unit 15. The system control unit 15 instructs a voice and display control unit 16 to notify an occupant of the vehicle of the in-vehicle apparatus to be controlled and the control content thereof determined by the estimation unit 13. The voice and display control unit 16 outputs a voice to notify the control content thereof based on the instruction via a speaker 3. A display device 4 indicates a detailed list of the in-vehicle apparatus to be controlled and a control content thereof. Thus, an occupant of the vehicle can select a permitted in-vehicle apparatus, a control of which is permitted, and a prohibited in-vehicle apparatus, a control of which is not permitted, on a display screen of the display device 4. For example, a touch panel may be provided on the display device 4 to enable an occupant to specify a permitted in-vehicle apparatus, a control of which is permitted, and a prohibited in-vehicle apparatus, a control of which is not permitted, by touching the screen. Alternatively, a permitted in-vehicle apparatus, a control of which is permitted, and a prohibited in-vehicle apparatus, a control of which is not permitted, may be specified by manipulating a cursor indicated on the display device 4. A prohibited in-vehicle device, a control of which is not permitted, is deleted from the indicated group of in-vehicle apparatuses to be controlled. When an occupant of the vehicle instructs an in-vehicle apparatus and a control content thereof, which are not indicated on the display device 4, via a voice, the instructed in-vehicle apparatus and the instructed control content thereof may be added to an in-vehicle apparatus to be controlled and a control content thereof.

When the control notified by the occupant is permitted (acceptance of service), the system control unit 15 outputs a drive instruction to a drive control unit 17 so as to perform the control (control content) permitted by the occupant. An occupant may instruct permission and prohibition of the control by manipulating a response switch 2 including at least a permission switch or by causing voice to the microphone 1 to instruct permission and prohibition of the control. The drive control unit 17 outputs a control instruction signal to each of the ECUs 5 to 7 so as to perform the control permitted by the occupant. For example, the body ECU 5 controls actuators such as a fuel lid actuator, a power window (PW) actuator, a trip switch, and a door lock actuator, based on the control instruction signal. The fuel lid actuator opens and closes a fuel lid. The PW actuator opens and closes a window of a driver's seat. The trip switch resets a trip meter. The door lock actuator locks and unlocks a door of the driver's seat. Thus, in-vehicle apparatuses are controlled to provide services in various kinds of conditions where the vehicle is placed. Thereby, an operation of in-vehicle apparatuses performed by an occupant can be reduced.

The traveling ECU 6 controls a throttle actuator for manipulating a position of a throttle valve to perform a constant speed traveling control so as to drive the vehicle at a constant speed. The vehicle may include a radar sensor for detecting the distance from another preceding vehicle traveling ahead of the vehicle. In this case, the traveling ECU 6 may perform a preceding-vehicle-tracking-type constant-speed traveling control. Specifically, when a preceding vehicle exists, the vehicle may be driven to track (follow) the preceding vehicle. Alternatively, when a preceding vehicle does not exist, the vehicle may be driven at a set speed. In the present embodiment, the vehicle includes a constant speed traveling device, and the traveling ECU 6 configures a part the constant speed traveling device. Therefore, the traveling ECU 6 can perform a constant speed traveling control of the vehicle automatically based on a control instruction signal. The navigation ECU 7 is connected with a communication device for performing telephone call and data communications with an external device. An occupant is capable of performing telephone call and instructing to perform data communications using the communication device via the navigation ECU 7. The navigation ECU 7 is capable of automatically starting telephone call and data communications with an external device by outputting a control instruction signal. In the present structure, in an emergency case such as a condition where failure occurs in the vehicle, an occupant is capable of performing telephone call to a cell center such as a help desk, for example. Thus, such an emergency case can be appropriately treated with support of an operator of the call center. When one of the ECUs 5 to 7 receives a control instruction signal from the drive control unit 17, the one of the ECUs 5 to 7 controls various kinds of in-vehicle apparatuses including the actuators and the switch according to the received control instruction signal. In this way, a control permitted by the occupant is performed.

When the drive control unit 17 outputs a control instruction signal, the system control unit 15 transmits a signal, which specifies that the control is performed, to the estimation unit 13. On reception of the signal from the system control unit 15, the estimation unit 13 stores an in-vehicle apparatus, to which the control is performed, and a control content thereof as the learning data 14 for each scene specifying a condition where the vehicle is placed.

First Control Example

Figure 2:
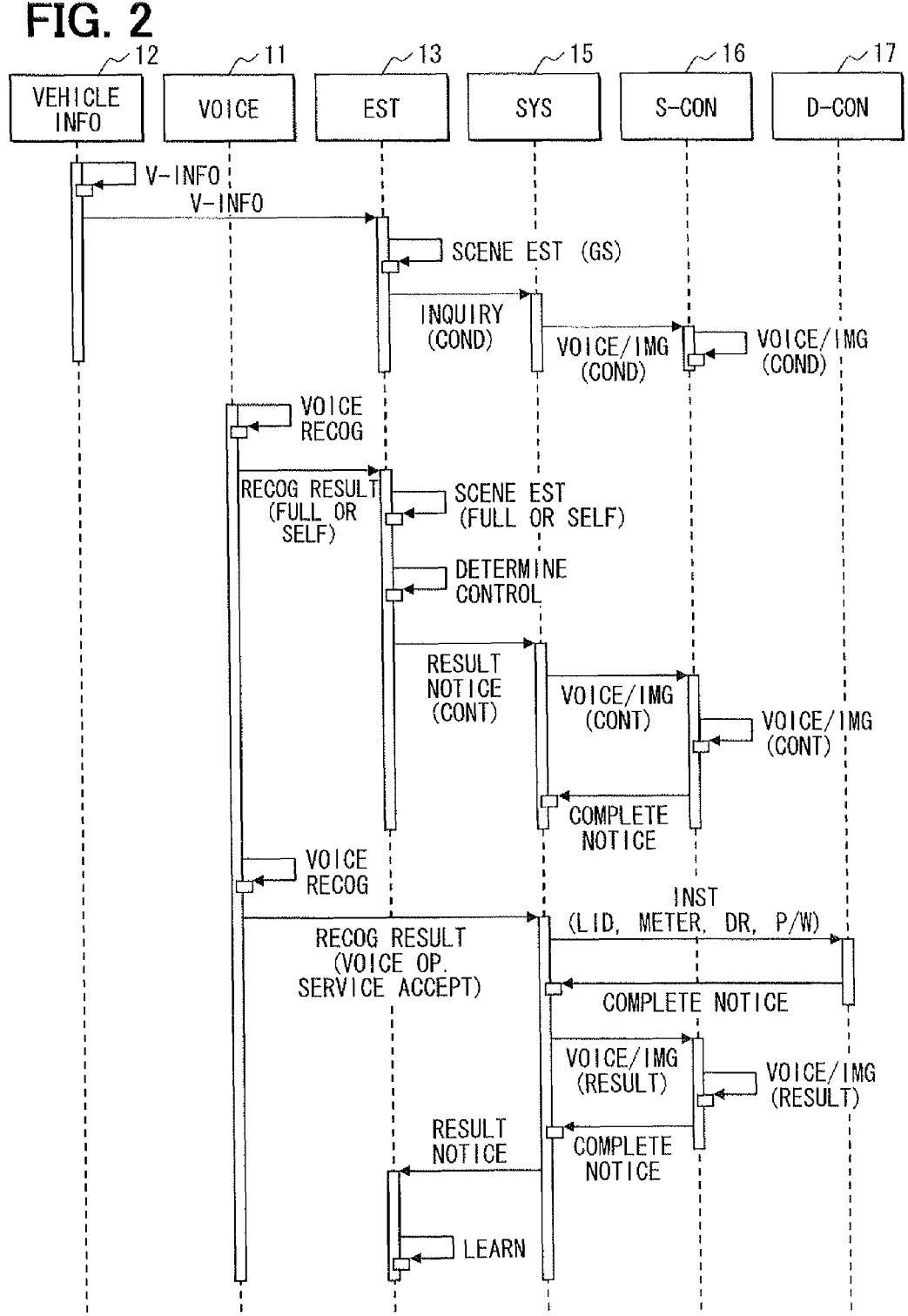
FIG. 2 is a sequence chart showing a fuel supply preparation control in a fuel station as a first control example performed by the control system.
Figure 3:
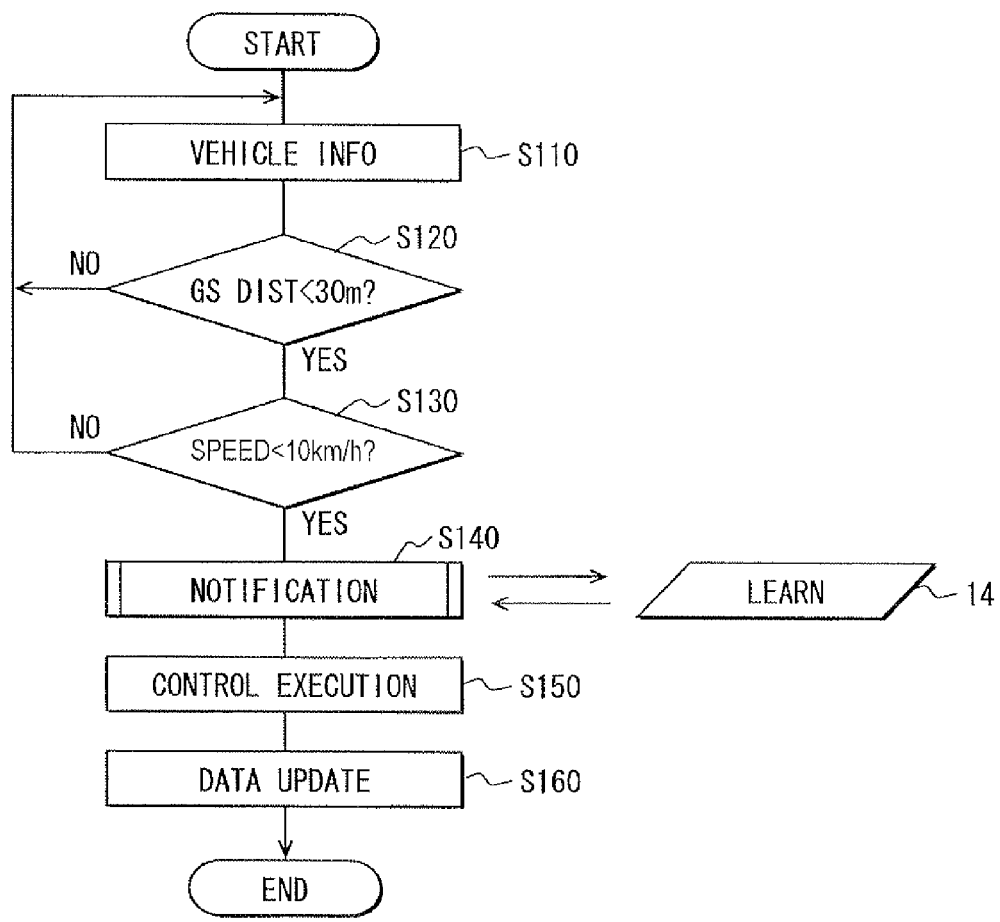
FIG. 3 is a flow chart showing the fuel supply preparation control in a fuel station.
Figure 4:
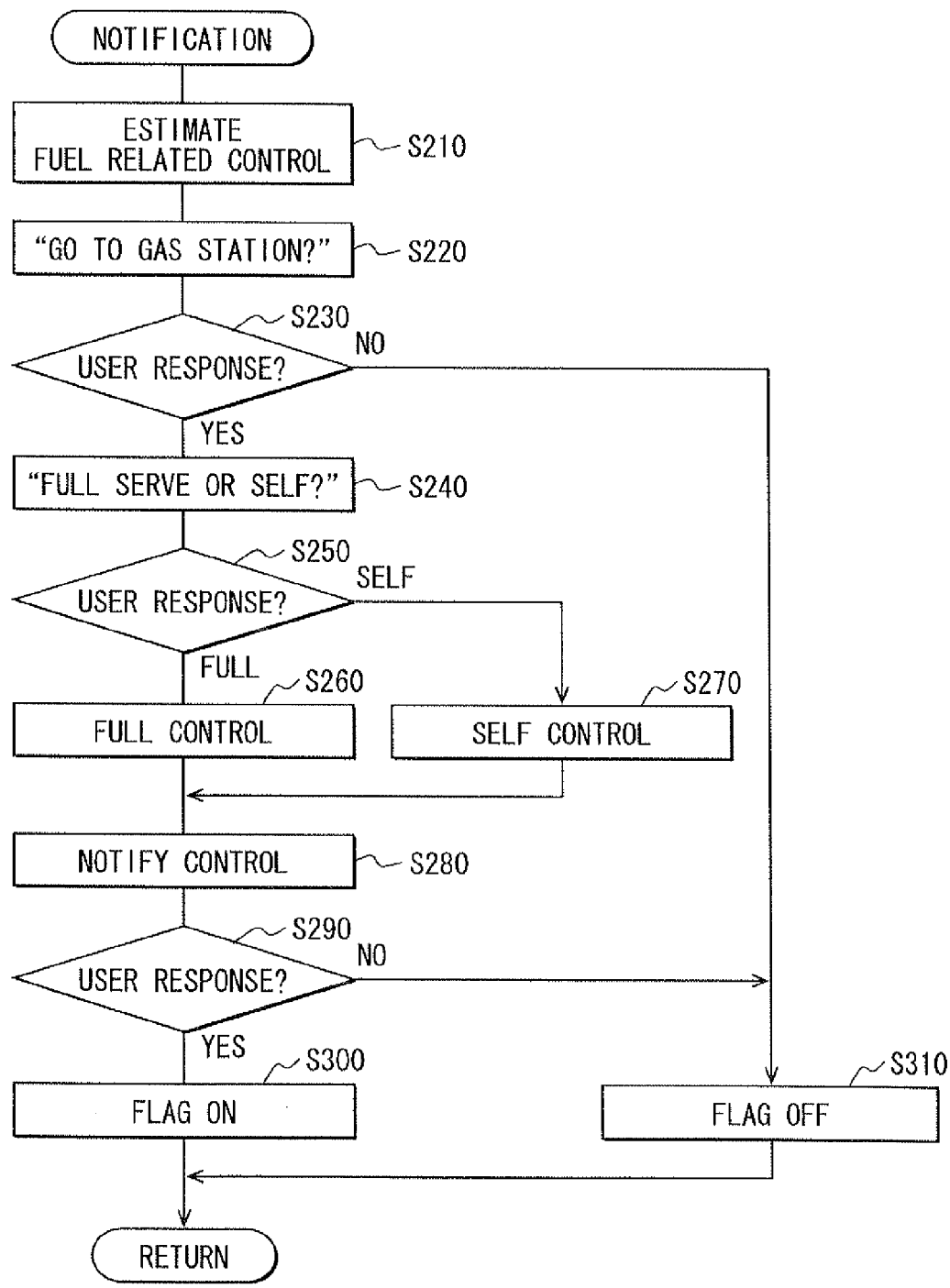
FIG. 4 is a flow chart showing a detailed operation of a determination and notification of a control content in FIG. 3.

Subsequently, detailed examples of controls performed by the control system for an in-vehicle apparatus will be described. First, with reference to FIGS. 2 to 4, a control performed for preparation of fuel supply when the vehicle is supplied with fuel in a fuel station will be described as the first example. FIG. 2 is a sequence chart showing a fuel supply preparation control in a fuel station. FIG. 3 is a flow chart showing the fuel supply preparation control. FIG. 4 is a flow chart showing a detailed operation of determination and notification of a control content in FIG. 3.

First, at step S110 of FIG. 3, the estimation unit 13 obtains vehicle information about a condition, where the vehicle is placed, transmitted from each of the ECUs 5, 6, 7. As shown in FIG. 2, the vehicle information input unit 12 of the control device 10 receives the vehicle information. The vehicle information input unit 12 sends the vehicle information to the estimation unit 13. On reception of the vehicle information, the estimation unit 13 estimates a condition (scene), where the vehicle is placed, based on the received vehicle information. In the example of FIG. 3, at step S120, it is determined whether the self-vehicle approaches a fuel station according to the distance from the fuel station. Specifically, the determination is made based on information about the position of the vehicle or a information about facility near the vehicle transmitted from the navigation ECU 7. When it is determined that the vehicle approaches the fuel station, the processing proceeds to step S130. As step 130, it is determined whether a speed of the vehicle transmitted from the traveling ECU 6 decreases and less than or equal to a predetermined speed such as 10 km/h so as to determine whether the vehicle is being stopped in the fuel station. When it is determined that the vehicle speed decreases and less than or equal to the predetermined speed, it is determined that an occupant is going to supply fuel in the fuel station. In this case, the present processing proceeds to step S140. In this way, the estimation unit 13 estimates that the vehicle is in a scene where the vehicle is supplied with fuel in the fuel station based on the vehicle information. In the estimation of the scene, it may be estimated whether it is a scene, where the vehicle is supplied with fuel, in consideration of other information such as remaining fuel in the gasoline tank of the vehicle and/or the like.

It is noted that fuel stations include a full-service station, where a salesclerk performs various services such as supplying fuel to a vehicle, and a self-service station, where an occupant of a vehicle supplies fuel to the vehicle. Such difference between the full-service station and the self-service station is undetectable by a detection unit such as sensor of the vehicle. Therefore, at step S140, an occupant is inquired about insufficient information, i.e., difference between the full-service station and the self-service station. When a response is obtained from the occupant, a control content is determined such that an in-vehicle apparatus to be controlled and a control content thereof are switched based on the response specifying that the fuel station is the full-service station or the self-service. In this way, the fuel supply preparation control can be further suitably performed.

Subsequently, a detailed operation of the determination and notification of a control content at step S140 will be described with reference to the flow chart of FIG. 4.

At step S210 of FIG. 4, it is estimated that the vehicle is in a scene where the vehicle is to be supplied with fuel. Therefore, an in-vehicle apparatus for performing a preparation operation for fuel supply is estimated to be a controlled target. An in-vehicle apparatus to be estimated is beforehand defined for each of various kinds of controls such as a fuel supply preparation control. At step S220, an occupant of the vehicle is inquired whether the occupant uses a fuel station via a voice and/or a screen indication to make sure.

At step S230, a response of the occupant is recognized. When it is determined that the occupant uses the fuel station according to the recognized response, the processing proceeds to step S240. Alternatively, when it is determined that the occupant does not use the fuel station, the processing proceeds to step S310 at which a control flag, which specifies whether the fuel supply preparation control is performed, is reset.

At step S240, the occupant of the vehicle is inquired whether the fuel station is a full-service station or a self-service station via a voice and/or a screen indication. Specifically, as shown in the sequence chart of FIG. 2, the estimation unit 13 instructs an inquiry of an insufficient condition to the system control unit 15. Thus, the system control unit 15 performs a voice output and/or a screen indication for inquiring an insufficient condition whether the fuel station is a full-service station or a self-service station using the speaker 3 and the display device 4.

At step S250 of FIG. 4, when it is determined that a response to the inquiry specifying the fuel station to be a full-service station or a self-service station is obtained from the occupant, the processing proceeds to subsequent step according to a result of the determination. Specifically, when the fuel station is a full-service station, the processing proceeds to step S260. Alternatively, when the fuel station is a self-service station, the processing proceeds to step S270.

For example, the sequence chart of FIG. 2 shows a case where a response specifying a full-service station or a self-service station is obtained according to voice of the occupant of the vehicle. In this case, the voice recognition unit 11 provides a voice recognition result to the estimation unit 13. Whereby, the estimation unit 13 can determine whether the present state is a condition, in which a fuel supply preparation control in a full-service mode is needed, or a condition, in which a fuel supply preparation control in a self-service mode is needed. Therefore, the estimation unit 13 can appropriately determine an in-vehicle apparatus to be controlled and a control content thereof based on the response from the occupant. The occupant may perform the response using a display screen (image screen) on the display device 4. Specifically, a selection screen of a full-service station and a self-service station may be indicated on the display device 4, and an occupant may select one of the full-service station and the self-service station on the screen.

At step S260, an in-vehicle apparatus and a control content thereof for performing a fuel supply preparation control in the full-service mode are determined. Specifically, for example, a fuel lid actuator, a power window (P/W) actuator, and a trip switch are selected as in-vehicle apparatuses to be controlled. Further, opening of a fuel lid, opening of a window of the driver's seat, and resetting of a trip meter are determined to be control contents of each of the in-vehicle apparatuses to be controlled.

On the other hand, at step S270, an in-vehicle apparatus and a control content thereof for performing a fuel supply preparation control in the self-service mode are determined. Specifically, for example, a fuel lid actuator, a door lock actuator, and a trip switch are selected as in-vehicle apparatuses to be controlled. Further, opening of a fuel lid, unlocking of a door of the driver's seat, and resetting of a trip meter are determined to be control contents of each of the in-vehicle apparatuses to be controlled.

At step S260, the occupant of the vehicle is notified of the determined control content. Specifically, in the sequence chart of FIG. 2, the in-vehicle apparatus and the control content thereof determined by the estimation unit 13 is notified to the system control unit 15. The system control unit 15 instructs a voice output and/or a screen indication (image output) to the voice and display control unit 16 based on the notification from the estimation unit 13. The voice and display control unit 16 causes the speaker 3 to output a voice, which specifies the control content, and causes the display device 4 to indicate the in-vehicle apparatus and the control content thereof based on the instruction from the system control unit 15.

Specifically, when a fuel supply preparation control in the full-service mode is to be performed, the voice and display control unit 16 causes the speaker 3 to output a voice, which specifies the control content, such as "the fuel supply preparation control is performed in the full-service mode." Alternatively, when a fuel supply preparation control in the self-service mode is to be performed, the voice and display control unit 16 causes the speaker 3 to output a voice such as "the fuel supply preparation control is performed in the self-service mode." In each case, the display device 4 indicates a list of the in-vehicle apparatus and the control content thereof. Thus, an occupant can select and perform only a control of the in-vehicle apparatus considered to be needed in the condition. For example, when a meter need not be reset by a trip switch, an occupant may instruct to exclude the trip switch from the in-vehicle apparatus to be controlled via a voice or a display screen.

Alternatively, when an in-vehicle apparatus and a control content thereof, which are preferred, are not included in the list indicated on the display device 4, the occupant may instruct to add the in-vehicle apparatus and the control content thereof, which are preferred, as a controlled object via a voice. For example, in a fuel supply preparation control in the full-service mode, the occupant may prefer to decrease a sound volume of an audio device to have a smooth conversation with a salesclerk. In this case, the occupant may instruct "decrease a sound volume of the audio device" via a voice. Thereby, "decrease in a sound volume" is added as a control content, and "the audio device" is added as an in-vehicle device in the fuel supply preparation control in the full-service mode.

At step S290, it is determined whether a response of the occupant via a voice or via the response switch 2 is to permit the control. When the response of the occupant is to permit the control, the processing proceeds to step S300. Alternatively, when the response of the occupant is not to permit the control, the processing proceeds to step S310. At step S300, a control flag, which specifies whether a fuel supply preparation control is performed in the full-service mode or the self-service mode, is set (ON). Specifically, the sequence chart of FIG. 2 shows an example in which an occupant permits a control via a voice to receive a service produced by the control of an in-vehicle apparatus. In this case, the voice recognition unit 11 notifies the system control unit 15 of a voice recognition result specifying reception of the service.

Subsequent to completion of the determination and notification of the control content described with reference to FIG. 4, the processing proceeds to step S150 in FIG. 3. At step S150, when the control flag is set (ON), a control instruction signal is outputted for performing (executing) the control the corresponding in-vehicle apparatuses according to the determination at step S260 or S270. Specifically, as shown in the sequence chart of FIG. 2, the system control unit 15 outputs a drive instruction signal to the drive control unit 17 for driving a corresponding in-vehicle apparatus such as an actuator. Thereby, the drive control unit 17 outputs a control instruction signal to the body ECU 5 to perform a fuel supply preparation control in the full-service mode or the self-service mode. In response to beginning of the fuel supply preparation control, the system control unit 15 outputs an instruction signal to the voice and display control unit 16 so as to notify an occupant of activation of the fuel supply preparation control. In this manner, an occupant is notified of activation of the fuel supply preparation control via a voice and/or a screen indication.

Finally, at step S160, the controlled in-vehicle apparatus and the control content thereof are associated with the scene, which specifies the condition where the vehicle is placed, and the associated data is stored. Thus, the learning data 14 is updated.

According to the present embodiment, an occupant is inquired whether a fuel station is a full-service station or a self-service station. Whereby, information undetectable by using an in-vehicle sensor can be obtained from the occupant. In addition, an in-vehicle apparatus to be controlled and a control content thereof are changed (switched) in a fuel station according to the difference between a full-service station and a self-service station. Whereby, a service can be produced using a more suitable in-vehicle apparatus.

In the example described above, a fuel supply preparation control is performed in a fuel station to which an occupant of a vehicle visits for the first time. In such a fuel station, to which an occupant of a vehicle visits for the first time, it is necessary to confirm the occupant whether the fuel station is a full-service station or a self-service station. It is noted that, when the occupant visits the same fuel station again, a history of a control performed in the fuel station in the past and a scene associated therewith are stored as the learning data 14.

FIG. 5 shows an example of the learning data 14. With reference to the learning data 14, it is determined whether a fuel supply preparation control in the full-service mode is performed or a fuel supply preparation control in the self-service station mode is performed. Specifically, when the vehicle visits a fuel station (GS), it is determined whether the learning data 14 stores a control history of the fuel station on condition that the occupant of the vehicle replies to use the fuel station. When the control history of the fuel station is stored in the learning data 14, without inquiring whether the fuel station is a full-service station or a self-service station to the occupant, an in-vehicle apparatus and a control content thereof for performing a fuel supply preparation control in the full-service mode or the self-service station mode are determined. In this manner, an in-vehicle apparatus to be controlled and a control content thereof can be determined without bothering an occupant. Even in this case, the determined control content is notified, and permission of activation of the determined control content is requested to an occupant before actually performing the determined control. The present request is performed, since the determined control may not be needed for the occupant. With reference to the learning data 14, an in-vehicle apparatus, which was excluded from a controlled object or added to a controlled object in the past by an occupant of the vehicle, can be excluded and added in the present control. Therefore, a service can be provided by performing a control of an in-vehicle apparatus according to a preference of an occupant of the vehicle.

In the present example, a control history in a fuel station to be used at this time is stored. When a control history in a different fuel station, which provides the same kind of service, is stored, the control history may be reflected on determination of an in-vehicle device to be controlled and a control content thereof. Specifically, when a controlled object was excluded or added in a certain fuel station in the past, the controlled object may be similarly excluded or added in the present fuel station in determination of an in-vehicle device to be controlled and a control content thereof. The exclusion or addition of a controlled object may be performed similarly to the past, since an occupant of a vehicle has a tendency to prefer to receive a similar service to a service provided by an in-vehicle apparatus in the past when a condition where the vehicle is placed is similar. For example, an occupant may be identified in accordance with a key ID specified in a smart entry system. In this case, as shown in FIG. 5, the learning data 14 may include information about an identified occupant (driver information). Thus, a preference of each occupant can be further appropriately reflected on a control of an in-vehicle apparatus.

Other than the first example, various examples of inquiries an occupant about insufficient information, which is needed for a control of an in-vehicle apparatus, can be conceived. For example, when it is detected that the vehicle started traveling on a highway based on a road classification, on which the vehicle travels, inputted from the navigation ECU 7, a constant speed traveling device is estimated to be a controlled target. In this case, information specifying a speed, at which the vehicle is driven, is insufficient. In this case, an occupant of the vehicle is inquired about a preferred speed of a constant speed traveling control of the vehicle. In accordance with an obtained response to the inquiry, the constant speed traveling device is determined to be an in-vehicle apparatus to be controlled, and the constant speed traveling control at the preferred speed obtained from the occupant is determined to be a control content thereof. In this manner, the preferred speed, at which the occupant drives the vehicle at the constant speed, is obtained. Thus, a further appropriate control can be performed using the constant speed traveling device.

In the case, similarly to the fuel station described above, when the vehicle starts traveling on a highway, on which the vehicle had traveled in the past, and when a constant speed traveling device is estimated to be a controlled target, a control content can be determined according to a control history, when the vehicle traveled on the same highway in the past, stored in the learning data 14, without inquiring about a preferred speed to an occupant. The speed of the vehicle preferred by an occupant in the constant speed traveling control can be clearly determined according to the control history. Therefore, an occupant need not be inquired about a preferred speed. In this case, a control content is first determined, and the determined control content is notified to an occupant. Specifically, for example, the occupant is inquired about "Do you start the constant speed traveling control at a vehicle speed xx km/h?" In this way, the occupant is inquired whether to perform the determined control content. Thus, the determined control content can be prohibited from being performed contrary to an intention of the occupant of the vehicle.

Second Control Example

As follows, the second control example of the control system for an in-vehicle apparatus will be described. In the above-described first control example, an occupant is inquired about insufficient information in a control of an in-vehicle apparatus. Further, when a response is obtained from the occupant, an in-vehicle apparatus to be controlled and a control content thereof are determined based on the response. In the present second control example, even when an environment of a vehicle interior detected using various kinds of sensors does not satisfy a condition, control of the environment is performed according to a subject, which is said by an occupant of the vehicle and related to a preference of the control. As follows, a window defogging control will be described as one example of the second control example.

FIG. 6 is a sequence chart of the window defogging control. First, the vehicle information input unit 12 inputs a detection result of a moisture sensor, a temperature sensor outside the vehicle, and a temperature sensor inside the vehicle. The vehicle information input unit 12 outputs the inputted detection result as vehicle information to the estimation unit 13. The estimation unit 13 determines whether a window may be fogged based on a humidity in the vehicle interior, and the difference between temperature inside the vehicle interior and the temperature outside the vehicle interior. Specifically, the estimation unit 13 beforehand specifies a first region, a second region, and a third region in a graph having a horizontal axis corresponding to the humidity in the vehicle interior and a vertical axis corresponding to the difference between the temperature inside the vehicle interior and the temperature outside the vehicle interior. In the first region, a possibility that the window is fogged is significantly high. In the second region, a possibility that the window is fogged is significantly low. The third region is interposed between the first region and the second region. Further, one of the first to third regions, to which the relationship between the detected humidity in the vehicle interior and the difference between the temperature inside the vehicle interior and the temperature outside the vehicle interior belongs, is determined. Thus, it is determined whether the window is possibly fogged.

When the relationship between the humidity in the vehicle interior and the difference between the temperatures belongs to the first region, the possibility that a window is fogged is significantly high, as described above. Therefore, a defroster of an airconditioner is determined to be an in-vehicle apparatus to be controlled, irrespective of a voice of an occupant. Thus, a defogging control by activating the defroster is determined to be a control content.

On the other hand, when the relationship between the humidity in the vehicle interior and the difference between the temperatures belongs to the second region, the possibility that a window is fogged is significantly low, as described above. Therefore, the defroster of the airconditioner is excluded from an in-vehicle apparatus to be controlled, irrespective of a voice of an occupant. When a voice content of an occupant is erroneously recognized, the defroster may be erroneously determined to be an in-vehicle apparatus to be controlled, even when the defroster need not be controlled. On the contrary, according to the present example, an erroneous determination that the defroster is an in-vehicle apparatus to be controlled due to erroneous recognition of a voice content of an occupant can be restricted.

When the relationship between the humidity in the vehicle interior and the difference between the temperatures belongs to the third region, a window is not necessarily fogged. However, a window may be fogged in this condition. In this case, the estimation unit 13 estimates the defroster to be a controlled target and waits in the present state. In the present condition, for example, an occupant may say that "a window is fogged", "it is fogged and unseeable", and the like. That is, when the voice recognition unit 11 recognizes a voice of an occupant, which implies that a window is fogged, the estimation unit 13 determines the defroster to be an in-vehicle apparatus to be controlled and determines a control content to be defogging. Thus, the estimation unit 13 notifies, i.e., sends the determined in-vehicle apparatus and the determined control content thereof to the system control unit 15 so as to notify an occupant of the determined control content. The system control unit 15 instructs a voice output and a screen indication to the voice and display control unit 16 based on the notification from the estimation unit 13. The voice and display control unit 16 causes the speaker 3 to output a voice, which specifies the control content, and causes the display device 4 to indicate the in-vehicle apparatus and the control content thereof based on the instruction from the system control unit 15. In this case, for example, the speaker 3 outputs a voice of "defog a window?" Further, the display device 4 indicates a defroster as an in-vehicle apparatus to be controlled and displays a text of "defroster ON" as a control content thereof. When an occupant replies to the information of the control content via a voice or the response switch 2 to permit the control content, the system control unit 15 outputs a drive instruction to the drive control unit 17 for activating the defroster. Thereby, the drive control unit 17 outputs a control instruction signal to the body ECU 5. Thus, the defroster of the airconditioner is activated, and a window defogging control is performed. In response to beginning of the window defogging control, the system control unit 15 outputs an instruction signal to the voice and display control unit 16 so as to notify an occupant of activation of the fuel supply preparation control. In this manner, an occupant is notified of activation of the window defogging control via a voice and/or a screen indication.

As described above, in the window defogging control according to the present example of the second control, even when the relationship between the humidity in the vehicle interior and the difference between temperatures does not belong to the first region, i.e., even when the condition that a window is fogged is not satisfied, the defroster is determined to be an in-vehicle apparatus to be controlled on detection of a voice of an occupant, which implies defogging of a window. Thus, an in-vehicle apparatus can be further appropriately controlled for controlling an environment in the vehicle.

In the present second control example, when the window defogging control is performed, the control is associated with a scene, which specifies a condition where the vehicle is placed. Thus, a control history, which specifies a controlled in-vehicle apparatus and a control content thereof, is stored as the learning data 14. Further, a condition for determining necessity of a control of an environment in the vehicle may be changed with reference to the learning data 14. In the example of the above-described defogging control, for example, the first region may be enlarged such that the relationship between the humidity in the vehicle interior and the difference between the temperatures when the defogging control is performed belongs to the first region. In this manner, a condition for performing the window defogging control can be updated such that the condition becomes suitable for an occupant's feeling and a status of use.

Various control examples may be conceived other than the present second control example. That is, even when an environment of a vehicle interior detected using various kinds of sensors does not satisfy a condition, the environment may be controlled according to a subject, which is said by an occupant of the vehicle and related to a preference of the control, in other ways.

For example, when an occupant climbs into a vehicle, the temperature of the vehicle interior may be determined to be high based on detection results of various sensors such as a vehicle outside temperature sensor, a vehicle inside temperature sensor, and a solar sensor. In this case, the P/W actuator for opening and closing the window of each seat and an airconditioner may be estimated to be a controlled target in order to perform a ventilation control. In this case, a first condition and a second condition are predetermined in order to determine a high-temperature state in the vehicle interior. In the first condition, a possibility that the vehicle interior is in the high-temperature state is significantly high. In the second condition, a possibility that the vehicle interior is not in the high-temperature state is significantly high. It is determined whether a detection result of each sensor satisfies the first condition and the second condition. When the detection result of each sensor satisfies the first condition, an in-vehicle apparatus for performing a ventilation control is unconditionally determined to be an in-vehicle apparatus to be controlled. Alternatively, when the detection result of each sensor satisfies the second condition, the in-vehicle apparatus for performing the ventilation control is unconditionally excluded from an in-vehicle apparatus to be controlled.

When the detection result of each sensor satisfies neither the first condition nor the second condition, the P/W actuator and the airconditioner are estimated to be a controlled target. When it is recognized that an occupant says a subject implying that the vehicle interior is hot, the estimated apparatuses such as the P/W actuator and the airconditioner are determined to be an in-vehicle apparatus to be controlled. Further, it is determined to be a control content that opening of windows of all the seats and activating of the P/W actuator to operate the airconditioner to cause a maximum blow. Thus, heat in the vehicle interior can be quickly exhausted from the vehicle interior by performing such a ventilation control.

Further, subsequent to the ventilation control, the detection result of each sensor and a control history are stored as the learning data 14. Thus, the first condition for determining the high-temperature state is updated based on the learning data 14.

Third Control Example

As follows, the third control example of the control system for an in-vehicle apparatus will be described. In the third control example, information about a condition where the vehicle is placed is manipulating information when an occupant of the vehicle manipulates an in-vehicle apparatus. When the estimation unit 13 obtains such manipulating information via the vehicle information input unit 12, the estimation unit 13 estimates an in-vehicle guidance apparatus, which performs a manipulating guidance of an in-vehicle apparatus manipulated by an occupant, is estimated to be a controlled target.

When the voice recognition unit 11 recognizes words implying that the occupant cannot manipulate the in-vehicle apparatus, the estimation unit 13 determines, based on the occupant's words, that the in-vehicle guidance apparatus, which performs a manipulating guidance, is an in-vehicle apparatus to be controlled.

In recent vehicles, various kinds of in-vehicle apparatuses are controlled by electronic devices, and manipulation of such in-vehicle apparatuses is complicated. For example, in a vehicle having a push-type engine start button, an occupant pushes the engine start button while depressing a brake pedal to start an engine. In such a vehicle, when an occupant of the vehicle manipulates only the engine start button and when it is detected that a voice of an occupant implies that an engine is not started, it is highly possible that the occupant does not know an operating procedure for starting the engine. Therefore, in this case, a guidance operation for starting the engine is suggested to the occupant. When the suggestion is accepted by the occupant, the in-vehicle guidance apparatus shows the guidance operation. In this manner, troubles in manipulation of various kinds of in-vehicle apparatuses can reduced.

Fourth Control Example

As follows, the fourth control example of the control system for an in-vehicle apparatus will be described. In the fourth control example, information about a condition where the vehicle is placed is diagnostic information obtained from multiple in-vehicle apparatuses such as ECUs. When the estimation unit 13 obtains diagnostic information from each of the ECUs 5 to 7 through the vehicle information input unit 12, the estimation unit 13 estimates an in-vehicle communication apparatus, which is used for communication with a call center via phone call, to be a controlled target. When the voice recognition unit 11 recognizes words of an occupant implying that a malfunction occurs, the estimation unit 13 determines, based on the occupant's words, that the in-vehicle communication apparatus, which performs a telephone call to a call center, is an in-vehicle apparatus to be controlled. Thus, even when an in-vehicle apparatus such as an ECU of the vehicle causes a malfunction, an appropriate treatment can be quickly performed by an operator of a call center.

More specifically, the in-vehicle communication apparatus, which performs a telephone call to a call center, may be capable of performing data communications with the call center. In this case, the system control unit 15 is capable of transmitting vehicle information including the diagnostic information to the call center before the telephone call or in the telephone call. Thus, an operator of the call center can appropriately recognize the malfunction of the vehicle according to the diagnostic information.

In addition, personal information may be transmitted as a part of the vehicle information to a call center. The personal information may include at least one of the vehicle identification number, the registered name of the owner of the vehicle, the current position of the vehicle, and the traveling path of the vehicle. Such personal information is useful for an operator of the call center to hire a wrecker to move the vehicle when, for example, the vehicle is stuck due to a malfunction.

It is noted that the vehicle identification number, the registered name, the current position of the vehicle, and the traveling path of the vehicle belong to personal information. Therefore, an occupant of the vehicle is inquired about a permission of transmission of the personal information to the call center. Only when a response to permit transmission of the personal information is obtained from the occupant, vehicle information including the personal information is transmitted to the call center.

As described above, the desirable embodiments of the present invention have been mentioned. It is noted that the present invention is not limited to the above embodiments. The present invention may be variously modified and may be in practical use in a spirit of the present invention.

For example, in the above embodiments, voice of an occupant of the vehicle is detected using the microphone 1, and voice data of the detected voice is recognized by the voice recognition unit 11. Alternatively, for example, a camera may be provided in the vehicle interior to obtain an image of an occupant of the vehicle. In this case, a response and an intention of the occupant may be estimated according to an action of the occupant in the image obtained using the camera. For example, when an occupant bows the head to a suggestion of a control, the suggested control is estimated to be permitted. On the contrary, when an occupant shakes the head to the suggested control, the suggested control is estimated to be refused. Furthermore, for example, when an occupant wipes a window, it is estimated that the occupant intends to remove fog from the window.

Summarizing the above embodiments, the control system for an in-vehicle apparatus includes:

multiple in-vehicle apparatuses mounted in the vehicle;

an obtaining unit configured to obtain information about a condition where the vehicle is placed;

a detection unit configured to detect at least one of a voice and an action of an occupant of the vehicle;

a notification unit configured to notify an in-vehicle apparatus to be controlled and a control content thereof, which are determined by a determination unit, to an occupant of the vehicle; and a control unit configured to control the in-vehicle apparatus according to the determination of the determination unit when a response to the notification of the notification unit to permit the control is obtained from the occupant.

As described above, the detection unit is configured to detect at least one of a voice and an action of an occupant. A determination unit estimates an in-vehicle apparatus to be a controlled target according to the condition where the vehicle is placed. The determination unit further determines an in-vehicle apparatus to be controlled and a control content thereof in consideration of the voice and the action of the occupant.

Therefore, information unacquirable by a sensor of the vehicle can be detected based on a voice of an occupant. In addition, a state, where a control is needed even when a condition for performing the control is not completely satisfied, can be also detected based on a voice of an occupant. An in-vehicle apparatus to be controlled and a control content thereof are determined in consideration of a voice and an action of an occupant. Thereby, the determined in-vehicle apparatus can further appropriately suggest a service to an occupant of the vehicle by a more suitable in-vehicle apparatus in a condition where the vehicle is placed.

The control system for an in-vehicle apparatus may further include a storing unit configured to store a control history of an in-vehicle apparatus controlled by the control unit and a control content thereof in a condition where the vehicle is placed. The determination unit may determine an in-vehicle apparatus to be controlled and a control content thereof in consideration of a control history when the control history of the in-vehicle apparatus controlled in a condition similar to the condition where the vehicle is placed and the control content thereof is stored in the storing unit. An occupant of a vehicle has a tendency to prefer to receive a similar service to a service produced by an in-vehicle apparatus in the past when a condition where the vehicle is placed is similar.

When the determination unit estimates an in-vehicle apparatus to be a controlled target according to a condition where the vehicle is placed, the determination unit may inquire an occupant あぼう t the vehicle about information, which is needed to determine an in-vehicle apparatus to be controlled and a control content thereof. In this case, when a response to the inquiry is obtained according to at least one of a voice and an action of the occupant, the determination unit may determine an in-vehicle apparatus to be controlled and a control content thereof based on the at least one of a voice and an action of the occupant.

For example, when detecting that the vehicle is supplied with fuel in a fuel station, the determination unit may inquire an occupant whether the fuel station is a full-service station or a self-service station. Whereby, information undetectable by using an in-vehicle sensor can be obtained from an occupant. In addition, an in-vehicle apparatus to be controlled and a control content thereof may be changed in a fuel station according to the difference between a full-service station and a self-service station. Whereby, a service can be produced using a more suitable in-vehicle apparatus.

For example, the vehicle may include a constant speed traveling device such as a preceding vehicle tracking type constant speed traveling device. In this case, when the navigation system detects that the vehicle starts traveling on a highway, the constant speed traveling device may be estimated to be an in-vehicle apparatus used as a controlled target. Further, an occupant of the vehicle is inquired about a preferred speed at which a constant speed traveling of the vehicle is performed. When a response is obtained to the inquiry, the vehicle performs the constant speed traveling at the preferred speed. In this manner, the preferred speed, at which the occupant drives the vehicle at the constant speed, is obtained according to a voice of the occupant. Thus, a further appropriate control can be performed using the constant speed traveling device.

The control system for an in-vehicle apparatus may further include a storing unit configured to store a control history of an in-vehicle apparatus controlled by the control unit and a control content thereof in a condition where the vehicle is placed. The determination unit may determine an in-vehicle apparatus to be controlled and a control content thereof based on a control history, without inquiring to an occupant, when the control history of the controlled in-vehicle apparatus and the control content thereof in a condition same as the condition where the vehicle is placed is stored in the storing unit.

For example, when a control history of a certain fuel station is stored, information, which specifies that the certain fuel station is one of a full-service station and a self-service station, has been already obtained from an occupant of the vehicle. In addition, an in-vehicle apparatus controlled according to the obtained information and a control content thereof is stored in the storing unit. Furthermore, for example, when the vehicle starts traveling on a highway, which the vehicle traveled in the past, and when a control history of traveling the same highway in the past is stored, a preferred speed of an occupant in a constant speed traveling of the vehicle is obvious according to the control history. Therefore, in such a case, without inquiry to an occupant of the vehicle, information needed for controlling an in-vehicle apparatus is acquirable from the control history stored in the storing unit.

The information about a condition where the vehicle is placed may include environment information about an environment of an interior of the vehicle. In this case, the determination unit may determine whether the environment information satisfies a first condition, which specifies that an in-vehicle apparatus for controlling an environment of the interior of the vehicle need to be controlled, or whether the environment information satisfies a second condition, which specifies that the in-vehicle apparatus need not be controlled. When the environment information does not satisfy both the first and second condition, the determination unit may estimate the in-vehicle apparatus for controlling an environment of the interior of the vehicle to be an in-vehicle apparatus as a controlled target. When detecting a voice and/or an action specifying that an occupant prefers a control of an environment of the interior of the vehicle, the determination unit may determine that the in-vehicle apparatus for controlling an environment of the interior of the vehicle is an in-vehicle apparatus to be controlled, and the determination unit may determine a control content thereof, based on the voice and/or the action of the occupant.

For example, the determination unit determines, based on a humidity in the vehicle interior and the difference between a temperature of the vehicle interior and a temperature of the vehicle exterior, whether a windshield of the vehicle is fogged. In this case, a first condition is set for determining whether a control of a defroster of an airconditioner is needed due to fogging. In addition, a second condition is set for determining whether a control of the defroster is not needed due to non-fogging. Even when the humidity in the vehicle interior and the difference between the temperature of the vehicle interior and the temperature of the vehicle exterior do not satisfy both the first condition and the second condition, fog may occur depending on various disturbance factors. Therefore, the defroster may be estimated to be an in-vehicle apparatus as a controlled target. In such a condition, for example, when it is detected that an occupant of the vehicle says that "a window is fogged" or "it is fogged and unseeable" or when it is detected that an occupant wipes a window, the defroster is controlled to defog a window. In this way, when it is detected that an occupant prefers defogging of a window according to a voice and/or an action, the defroster is determined to be an in-vehicle apparatus to be controlled, even in a condition where the first condition, which specifies a windshield to be fogged, is not satisfied. Thus, the in-vehicle apparatus for controlling an environment of the vehicle interior can be further appropriately controlled.

When the environment information satisfies the first condition, the determination unit may determine that an in-vehicle apparatus for controlling an environment of the interior of the vehicle is an in-vehicle apparatus to be controlled and may determine a control content thereof, irrespective of a voice and/or an action of an occupant. When the environment information satisfies the second condition, the determination unit may exclude the in-vehicle apparatus for controlling an environment of the interior of the vehicle from an in-vehicle apparatus to be controlled, irrespective of a voice and/or an action of an occupant.

In the present example, when a humidity in the vehicle interior and the difference between a temperature of the vehicle interior and a temperature of the vehicle exterior satisfy the first condition, a possibility that a window is fogged is significantly high. Therefore, the defroster is preferably controlled. On the other hand, when a humidity in the vehicle interior and the difference between a temperature of the vehicle interior and a temperature of the vehicle exterior satisfy the second condition, a possibility that a window is fogged is significantly low. In this case, the defroster is excluded from an in-vehicle apparatus to be controlled. Thus, erroneous recognition of a voice and/or an action of an occupant can be reduced. Consequently, suggestion of unnecessary control can be reduced.

The control system for an in-vehicle apparatus may further include a storing unit configured to store a control history of an in-vehicle apparatus controlled by the control unit and a control content thereof in an environment of an interior of the vehicle. In this case, the determination unit may update the first condition based on the control history to conform to an environment of the interior of the vehicle when the control is performed. In this manner, the first condition for performing the control can be updated such that the first condition becomes suitable for an occupant's feeling and a status of use.

The information about the condition where the vehicle is placed may include operation information when an occupant of the vehicle manipulates an in-vehicle apparatus. In this case, the determination unit may estimate an in-vehicle apparatus, which is configured to perform manipulating guidance of the in-vehicle apparatus manipulated by the occupant of the vehicle, to be an in-vehicle apparatus as a controlled target. In addition, when detecting a voice and/or an action of an occupant specifying that the occupant cannot smoothly manipulate the in-vehicle apparatus, the determination unit may determine the in-vehicle apparatus, which is configured to perform the manipulating guidance, to be an in-vehicle apparatus to be controlled and may determine a control content thereof based on the voice and/or the action of the occupant.

In recent vehicles, various kinds of in-vehicle apparatuses are controlled by electronic devices, and manipulation of such in-vehicle apparatuses is complicated. For example, in a vehicle having a push-type engine start button, an occupant pushes the engine start button while depressing a brake pedal to start an engine. In such a vehicle, when an occupant of the vehicle manipulates only the engine start button and when it is detected that a voice of an occupant implies that an engine is not started, it is highly possible that the occupant does not know an operating procedure for starting the engine. Therefore, in this case, a guidance for starting the engine is suggested to the occupant. In this manner, troubles in manipulation of various kinds of in-vehicle apparatuses can reduced.

The information about the condition where the vehicle is placed may include diagnostic information obtained from multiple in-vehicle apparatuses. In this case, the determination unit may estimate an in-vehicle apparatus, which is configured to perform communication with a call center via phone call, to be an in-vehicle apparatus as a controlled target when diagnostic information is obtained from an in-vehicle apparatus. In addition, when detecting a voice and/or an action of an occupant specifying a malfunction, the determination unit may determine that the in-vehicle apparatus, which is configured to perform communication with a call center via phone call, is an in-vehicle apparatus to be controlled based on the voice and/or the action of the occupant. Thus, even when an in-vehicle apparatus of the vehicle causes a malfunction, an appropriate treatment can be quickly performed by an operator of a call center.

The in-vehicle apparatus configured to perform communication with a call center via phone call may be configured to perform data communications with a call center and may be configured to transmit vehicle information including diagnostic information to a call center. Thus, an operator of the call center can appropriately recognize the malfunction of the vehicle according to the diagnostic information.

The in-vehicle apparatus may be configured to inquire an occupant of the vehicle whether the occupant permits transmission of personal information including at least one of a vehicle identification number, a registered name of an owner of the vehicle, a current position of the vehicle, and a traveling path of the vehicle. In this case, the in-vehicle apparatus may transmit vehicle information including the personal information to a call center when obtaining a response, which specifies that the occupant permits transmission of the personal information, from the occupant. Such personal information is useful for an operator of the call center to hire a wrecker to move the vehicle when, for example, the vehicle is stuck. It is noted that transmission of such personal information may be preferably performed when an occupant permits the transmission.

When a notification unit notifies an in-vehicle apparatus determined to be controlled and a control content thereof to an occupant of the vehicle and when an occupant of the vehicle instructs to add or delete an in-vehicle apparatus to be controlled and a control content, the control unit may correct to add or delete the in-vehicle apparatus to be controlled and the control content thereof according to an instruction of the occupant of the vehicle to add or delete the in-vehicle apparatus to be controlled and the control content thereof. In this case, the in-vehicle apparatus may be controlled according to the corrected in-vehicle apparatus and the corrected control content thereof. In this manner, an occupant of the vehicle can correct the notified in-vehicle device to be controlled and the notified control content thereof to conform with a preference of the occupant.

The above examples can be combined as appropriate.

The above processings such as calculations and determinations are not limited being executed by the control device 10. The control unit may have various structures including the control device 10 shown as an example.

The above processings such as estimations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A control system for a vehicle, the control system comprising:
   a plurality of in-vehicle apparatuses of the vehicle;
   an obtaining unit configured to obtain information about a position of the vehicle;
   a detection unit configured to detect at least one of a voice and an action of an occupant of the vehicle;
   a determination unit configured to
      estimate an in-vehicle apparatus from the plurality of in-vehicle apparatuses to be a controlled target according to the position of the vehicle, and
      determine an in-vehicle apparatus to be controlled from the plurality of in-vehicle apparatuses and a control content of the determined in-vehicle apparatus in consideration of the detected at least one of a voice and an action of the occupant;
   a notification unit configured to notify the occupant of the in-vehicle apparatus to be controlled determined by the determination unit and the control content of the determined in-vehicle apparatus; and
   a control unit configured to control the determined in-vehicle apparatus according to the determination of the determination unit when receiving a response to the notification of the notification unit from the occupant to permit the control of the determined in-vehicle apparatus, wherein
   the information about the condition where the vehicle is placed includes environment information about an environment of an interior of the vehicle,
   the determination unit is configured to determine whether the environment information satisfies a first condition, which specifies that an in-vehicle environment control apparatus for controlling the environment of the interior of the vehicle need to be controlled,
   the determination unit is further configured to determine whether the environment information satisfies a second condition, which specifies that the in-vehicle environment control apparatus need not be controlled,
   when the environment information satisfies neither the first condition nor the second condition, the determination unit estimates the in-vehicle environment control apparatus to be the controlled target, and
   when the detection unit detects at least one of a voice and an action specifying that the occupant prefers a control of the environment of the interior of the vehicle, the determination unit determines that the in-vehicle environment control apparatus is the in-vehicle apparatus to be controlled according to the detected at least one of a voice and an action, and the determination unit determines the control content of the determined in-vehicle apparatus according to the detected at least one of a voice and an action.

2. The control system according to claim 1, further comprising:
   a storing unit configured to store a control history of a controlled in-vehicle apparatus controlled by the control unit in a condition where the vehicle is placed and a control content of the controlled in-vehicle apparatus, wherein
   when a control history of a controlled in-vehicle apparatus controlled in a condition similar to the condition where the vehicle is placed and a control content of the controlled in-vehicle apparatus is stored in the storing unit, the determination unit determines the in-vehicle apparatus to be controlled and the control content of the determined in-vehicle apparatus in consideration of the control history.

3. The control system according to claim 1, wherein
   when the determination unit estimates the in-vehicle apparatus to be the controlled target according to the condition where the vehicle is placed, the determination unit inquires the occupant of the vehicle about information, which is needed to determine the in-vehicle apparatus to be controlled and the control content of the determined in-vehicle apparatus,
   when a response to the inquiry is obtained according to the detected at least one of a voice and an action of the occupant, the determination unit determines the in-vehicle apparatus to be controlled and the control content of the determined in-vehicle apparatus according to the detected at least one of a voice and an action of the occupant.

4. The control system according to claim 3, further comprising:
   a storing unit configured to store a control history of a controlled in-vehicle apparatus controlled by the control unit in a condition where the vehicle is placed and a control content of the controlled in-vehicle apparatus, wherein when a control history of a controlled in-vehicle apparatus controlled in a condition same as the condition where the vehicle is placed and a control content of the controlled in-vehicle apparatus is stored in the storing unit, the determination unit determines the in-vehicle apparatus to be controlled and the control content of the determined in-vehicle apparatus according to the control history, without inquiring to the occupant.

5. The control system according to claim 1, wherein
when the environment information satisfies the first condition, the determination unit determines that the in-vehicle environment control apparatus is the in-vehicle apparatus to be controlled and determine the control content of the determined in-vehicle apparatus, irrespective of the at least one of a voice and an action of the occupant, and
when the environment information satisfies the second condition, the determination unit excludes the in-vehicle environment control apparatus from the in-vehicle apparatus to be controlled, irrespective of the at least one of a voice and an action of an occupant.

6. The control system according to claim 1, further comprising:
a storing unit configured to store a control history of a controlled in-vehicle apparatus controlled by the control unit in an environment of the interior of the vehicle and a control content of the controlled in-vehicle apparatus, wherein
the determination unit is configured to update the first condition according to the control history to conform to the environment of the interior of the vehicle in a condition where the in-vehicle apparatus was controlled by the control unit.

7. The control system according to claim 1, wherein
the information about the condition where the vehicle is placed further includes operation information when an occupant of the vehicle manipulates an in-vehicle apparatus,
the determination unit is configured to estimate an in-vehicle guidance apparatus, which is configured to perform guidance of manipulation of an in-vehicle apparatus manipulated by an occupant, to be the controlled target, and
when the detection unit detects at least one of a voice and an action of an occupant specifying that the occupant is incapable of smoothly manipulating the in-vehicle apparatus, the determination unit determines that the in-vehicle guidance apparatus is the in-vehicle apparatus to be controlled and determines the control content of the determined in-vehicle apparatus according to the detected at least one of a voice and an action.

8. The control system according to claim 1, wherein
the information about the condition where the vehicle is placed further includes diagnostic information obtained from the plurality of in-vehicle apparatuses,
the determination unit is configured to estimate an in-vehicle communication apparatus, which is configured to perform communication with a call center via phone call, to be the controlled target when diagnostic information is obtained from the plurality of in-vehicle apparatuses, and
when the detection unit detects at least one of a voice and an action of an occupant specifying a malfunction, the determination unit determines that the in-vehicle communication apparatus is the in-vehicle apparatus to be controlled according to the detected at least one of a voice and an action.

9. The control system according to claim 8, wherein the in-vehicle communication apparatus is configured to perform data communications with a call center and configured to transmit vehicle information including the diagnostic information to a call center.

10. The control system according to claim 9, wherein
the in-vehicle communication apparatus is configured to inquire an occupant of the vehicle whether the occupant permits transmission of personal information including at least one of a vehicle identification number of the vehicle, a registered name of an owner of the vehicle, a current position of the vehicle, and a traveling path of the vehicle, and
the in-vehicle communication apparatus transmits the vehicle information including the personal information to a call center when obtaining a response, which specifies that the occupant permits transmission of the personal information, from the occupant.

11. The control system according to claim 1, wherein
when the notification unit notifies the occupant of the vehicle of the in-vehicle apparatus determined to be controlled and the control content of the determined in-vehicle apparatus and when the occupant of the vehicle instructs to add or delete an in-vehicle apparatus to be controlled and a control content of the instructed in-vehicle apparatus, the control unit corrects to add or delete the instructed in-vehicle apparatus and the control content of the instructed in-vehicle apparatus according to the instruction of the occupant, and
the in-vehicle apparatus is controlled according to the corrected in-vehicle apparatus and the corrected control content.

12. The control system according to claim 1, wherein the determination unit is configured to determine the in-vehicle apparatus to be controlled and the control content of the determined in-vehicle apparatus in consideration of the estimated controlled target and the at least one of a voice and an action of an occupant.

13. The control system according to claim 12, wherein the determination unit is configured to determine the in-vehicle apparatus to be controlled from the estimated controlled target.

14. A control system for a vehicle, the control system comprising:
a plurality of in-vehicle apparatuses of the vehicle;
an obtaining unit configured to obtain information about a condition where the vehicle is placed;
a detection unit configured to detect at least one of a voice and an action of an occupant of the vehicle;
a determination unit configured to
estimate an in-vehicle apparatus from the plurality of in-vehicle apparatuses to be a controlled target according to the condition where the vehicle is placed and
determine an in-vehicle apparatus to be controlled from the plurality of in-vehicle apparatuses and a control content of the determined in-vehicle apparatus in consideration of the detected at least one of a voice and an action of the occupant;
a notification unit configured to notify the occupant of the in-vehicle apparatus to be controlled determined by the determination unit and the control content of the determined in-vehicle apparatus; and
a control unit configured to control the determined in-vehicle apparatus according to the determination of the determination unit when receiving a response to the notification of the notification unit from the occupant to permit the control of the determined in-vehicle apparatus, wherein the information about the condition where the vehicle is placed includes diagnostic information obtained from the plurality of in-vehicle apparatuses, the determination unit is configured to estimate an in-vehicle communication apparatus, which is configured to perform communication with a call center via phone call, to be the controlled target when diagnostic information is obtained from the plurality of in-vehicle apparatuses, when the detection unit detects at least one of a voice and an action of an occupant specifying a malfunction, the determination unit determines that the in-vehicle communication apparatus is the in-vehicle apparatus to be controlled according to the detected at least one of a voice and an action, the in-vehicle communication apparatus is configured to perform data communications with a call center and configured to transmit vehicle information including the diagnostic information to a call center, the in-vehicle communication apparatus is configured to inquire an occupant of the vehicle whether the occupant permits transmission of personal information including at least one of a vehicle identification number of the vehicle, a registered name of an owner of the vehicle, a current position of the vehicle, and a traveling path of the vehicle, and the in-vehicle communication apparatus transmits the vehicle information including the personal information to a call center when obtaining a response, which specifies that the occupant permits transmission of the personal information, from the occupant.

15. A control system for a vehicle, the control system comprising:

a plurality of in-vehicle apparatuses of the vehicle;

an obtaining unit configured to obtain information about a position of the vehicle;

a detection unit configured to detect at least one of a voice and an action of an occupant of the vehicle;

a determination unit configured to
estimate an in-vehicle apparatus from the plurality of in-vehicle apparatuses to be a controlled target according to the position of the vehicle and
determine an in-vehicle apparatus to be controlled from the plurality of in-vehicle apparatuses and a control content of the determined in-vehicle apparatus in consideration of the detected at least one of a voice and an action of the occupant;

a notification unit configured to notify the occupant of the in-vehicle apparatus to be controlled determined by the determination unit and the control content of the determined in-vehicle apparatus; and a control unit configured to control the determined in-vehicle apparatus according to the determination of the determination unit when receiving a response to the notification of the notification unit from the occupant to permit the control of the determined in-vehicle apparatus, wherein the information about the position of the vehicle includes environment information about an environment of an interior of the vehicle in the position of the vehicle, the determination unit is configured to determine whether the environment information satisfies a first condition, which specifies that an in-vehicle environment control apparatus for controlling the environment of the interior of the vehicle need to be controlled, the determination unit is further configured to determine whether the environment information satisfies a second condition, which specifies that the in-vehicle environment control apparatus need not be controlled, when the environment information does not satisfy both the first and second conditions, the determination unit estimates the in-vehicle environment control apparatus to be the controlled target, and when the detection unit detects at least one of a voice and an action specifying that the occupant prefers a control of the environment of the interior of the vehicle, the determination unit determines that the in-vehicle environment control apparatus is the in-vehicle apparatus to be controlled according to the detected at least one of a voice and an action, and the determination unit determines the control content of the determined in-vehicle apparatus according to the detected at least one of a voice and an action.

16. The control system according to claim 15, further comprising:

a storing unit configured to store a control history of a controlled in-vehicle apparatus controlled by the control unit in the position of the vehicle and a control content of the controlled in-vehicle apparatus, wherein when a control history of a controlled in-vehicle apparatus controlled in a condition similar to the position of the vehicle and a control content of the controlled in-vehicle apparatus is stored in the storing unit, the determination unit determines the in-vehicle apparatus to be controlled and the control content of the determined in-vehicle apparatus in consideration of the control history.

17. The control system according to claim 15, wherein
when the determination unit estimates the in-vehicle apparatus to be the controlled target according to the position of the vehicle, the determination unit inquires the occupant of the vehicle about information, which is needed to determine the in-vehicle apparatus to be controlled and the control content of the determined in-vehicle apparatus, when a response to the inquiry is obtained according to the detected at least one of a voice and an action of the occupant, the determination unit determines the in-vehicle apparatus to be controlled and the control content of the determined in-vehicle apparatus according to the detected at least one of a voice and an action of the occupant.

18. The control system according to claim 17, further comprising:

a storing unit configured to store a control history of a controlled in-vehicle apparatus controlled by the control unit in the position of the vehicle and a control content of the controlled in-vehicle apparatus, wherein when a control history of a controlled in-vehicle apparatus controlled in a condition same as the position of the vehicle and a control content of the controlled in-vehicle apparatus is stored in the storing unit, the determination unit determines the in-vehicle apparatus to be controlled and the control content of the determined in-vehicle apparatus according to the control history, without inquiring to the occupant.

19. The control system according to claim 15, wherein
when the environment information satisfies the first condition, the determination unit determines that the in-vehicle environment control apparatus is the in-vehicle apparatus to be controlled and determine the control content of the determined in-vehicle apparatus, irrespective of the at least one of a voice and an action of the occupant, and when the environment information satisfies the second condition, the determination unit excludes the in-vehicle environment control apparatus from the in-vehicle apparatus to be controlled, irrespective of the at least one of a voice and an action of an occupant.

20. The control system according to claim 15, further comprising:
a storing unit configured to store a control history of a controlled in-vehicle apparatus controlled by the control unit in an environment of the interior of the vehicle and a control content of the controlled in-vehicle apparatus, wherein
the determination unit is configured to update the first condition according to the control history to conform to the environment of the interior of the vehicle in a condition where the in-vehicle apparatus was controlled by the control unit.

21. The control system according to claim 15, wherein
the information about the position of the vehicle includes operation information when an occupant of the vehicle manipulates an in-vehicle apparatus in the position of the vehicle,
the determination unit is configured to estimate an in-vehicle guidance apparatus, which is configured to perform guidance of manipulation of an in-vehicle apparatus manipulated by an occupant, to be the controlled target, and
when the detection unit detects at least one of a voice and an action of an occupant specifying that the occupant is incapable of smoothly manipulating the in-vehicle apparatus, the determination unit determines that the in-vehicle guidance apparatus is the in-vehicle apparatus to be controlled and determines the control content of the determined in-vehicle apparatus according to the detected at least one of a voice and an action.

22. The control system according to claim 15, wherein
the information about the position of the vehicle includes diagnostic information obtained from the plurality of in-vehicle apparatuses in the position of the vehicle,
the determination unit is configured to estimate an in-vehicle communication apparatus, which is configured to perform communication with a call center via phone call, to be the controlled target when diagnostic information is obtained from the plurality of in-vehicle apparatuses, and
when the detection unit detects at least one of a voice and an action of an occupant specifying a malfunction, the determination unit determines that the in-vehicle communication apparatus is the in-vehicle apparatus to be controlled according to the detected at least one of a voice and an action.

23. The control system according to claim 22, wherein the in-vehicle communication apparatus is configured to perform data communications with a call center and configured to transmit vehicle information including the diagnostic information to a call center.

24. The control system according to claim 23, wherein
the in-vehicle communication apparatus is configured to inquire an occupant of the vehicle whether the occupant permits transmission of personal information including at least one of a vehicle identification number of the vehicle, a registered name of an owner of the vehicle, a current position of the vehicle, and a traveling path of the vehicle, and the in-vehicle communication apparatus transmits the vehicle information including the personal information to a call center when obtaining a response, which specifies that the occupant permits transmission of the personal information, from the occupant.

25. The control system according to claim 15, wherein
when the notification unit notifies the occupant of the vehicle of the in-vehicle apparatus determined to be controlled and the control content of the determined in-vehicle apparatus and when the occupant of the vehicle instructs to add or delete an in-vehicle apparatus to be controlled and a control content of the instructed in-vehicle apparatus, the control unit corrects to add or delete the instructed in-vehicle apparatus and the control content of the instructed in-vehicle apparatus according to the instruction of the occupant, and
the in-vehicle apparatus is controlled according to the corrected in-vehicle apparatus and the corrected control content.

26. The control system according to claim 15, wherein the determination unit is configured to determine the in-vehicle apparatus to be controlled and the control content of the determined in-vehicle apparatus in consideration of the estimated controlled target and the at least one of a voice and an action of an occupant.

27. The control system according to claim 26, wherein the determination unit is configured to determine the in-vehicle apparatus to be controlled from the estimated controlled target.

28. A control system for a vehicle, the control system comprising:
a plurality of in-vehicle apparatuses of the vehicle;
an obtaining unit configured to obtain information about a position of the vehicle;
a detection unit configured to detect at least one of a voice and an action of an occupant of the vehicle;
a determination unit configured to
estimate an in-vehicle apparatus from the plurality of in-vehicle apparatuses to be a controlled target according to the position of the vehicle and
determine an in-vehicle apparatus to be controlled from the plurality of in-vehicle apparatuses and a control content of the determined in-vehicle apparatus in consideration of the detected at least one of a voice and an action of the occupant;
a notification unit configured to notify the occupant of the in-vehicle apparatus to be controlled determined by the determination unit and the control content of the determined in-vehicle apparatus; and
a control unit configured to control the determined in-vehicle apparatus according to the determination of the determination unit when receiving a response to the notification of the notification unit from the occupant to permit the control of the determined in-vehicle apparatus, wherein
the information about the position of the vehicle includes diagnostic information obtained from the plurality of in-vehicle apparatuses in the position of the vehicle,
the determination unit is configured to estimate an in-vehicle communication apparatus, which is configured to perform communication with a call center via phone call, to be the controlled target when diagnostic information is obtained from the plurality of in-vehicle apparatuses,
when the detection unit detects at least one of a voice and an action of an occupant specifying a malfunction, the determination unit determines that the in-vehicle communication apparatus is the in-vehicle apparatus to be controlled according to the detected at least one of a voice and an action, the in-vehicle communication apparatus is configured to perform data communications with a call center and configured to transmit vehicle information including the diagnostic information to a call center, the in-vehicle communication apparatus is configured to inquire an occupant of the vehicle whether the occupant permits transmission of personal information including at least one of a vehicle identification number of the vehicle, a registered name of an owner of the vehicle, a current position of the vehicle, and a traveling path of the vehicle, and the in-vehicle communication apparatus transmits the vehicle information including the personal information to a call center when obtaining a response, which specifies that the occupant permits transmission of the personal information, from the occupant.

29. A control system for a vehicle, the control system comprising:

a plurality of in-vehicle apparatuses of the vehicle;

an obtaining unit configured to obtain information about a position of the vehicle;

a detection unit configured to detect at least one of a voice and an action of an occupant of the vehicle;

a determination unit configured to estimate an in-vehicle apparatus from the plurality of in-vehicle apparatuses to be a controlled target according to the position of the vehicle and determine an in-vehicle apparatus to be controlled from the plurality of in-vehicle apparatuses and a control content of the determined in-vehicle apparatus in consideration of the detected at least one of a voice and an action of the occupant;

a notification unit configured to notify the occupant of the in-vehicle apparatus to be controlled determined by the determination unit and the control content of the determined in-vehicle apparatus; and a control unit configured to control the determined in-vehicle apparatus according to the determination of the determination unit when receiving a response to the notification of the notification unit from the occupant to permit the control of the determined in-vehicle apparatus, wherein the determination unit is configured to determine the in-vehicle apparatus to be controlled and the control content of the determined in-vehicle apparatus in consideration of the estimated controlled target and the at least one of a voice and an action of an occupant.

30. The control system according to claim 29, wherein the determination unit is configured to determine the in-vehicle apparatus to be controlled from the estimated controlled target.

* * * * *